(No Model.) 2 Sheets—Sheet 1.
R. C. ANDERSEN.
COOKING UTENSIL.
No. 439,768. Patented Nov. 4, 1890.
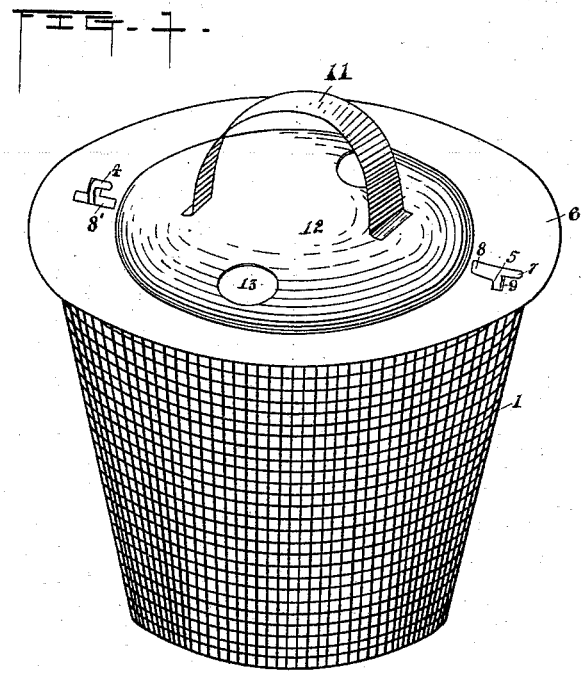
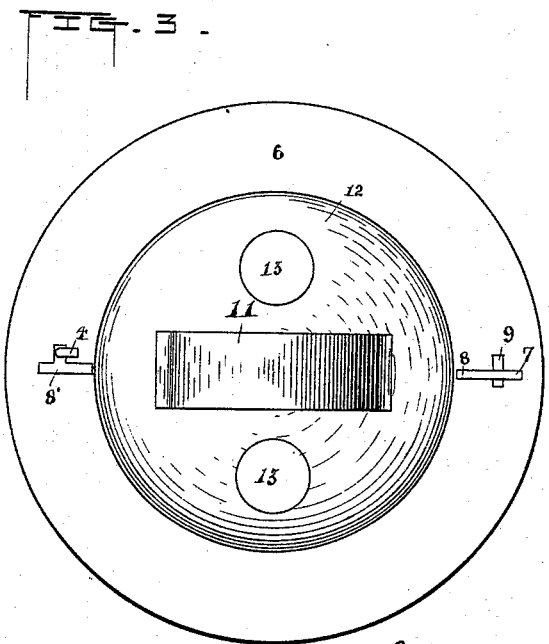
Witnesses
Arch. M. Catlin
James Smith
Inventor
Richard C Andersen
By his Attorney
Benj. R. Catlin (No Model.) 2 Sheets—Sheet 2.
R. C. ANDERSEN.
COOKING UTENSIL.
No. 439,768. Patented Nov. 4, 1890.
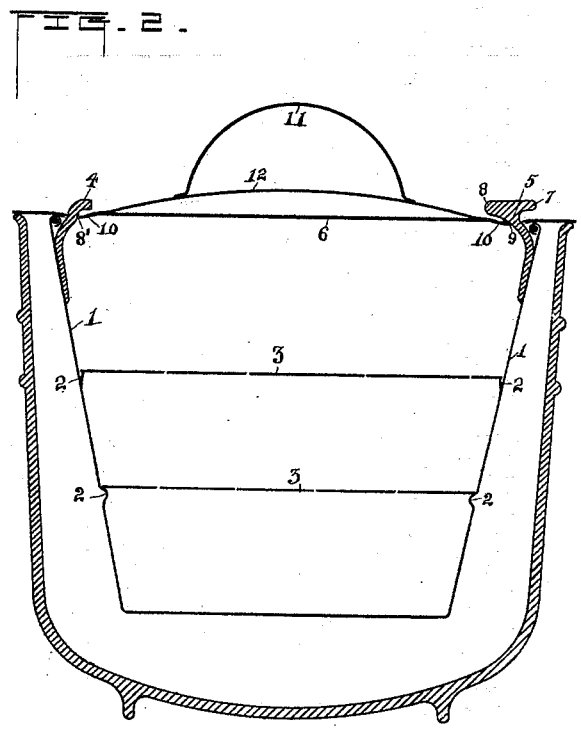
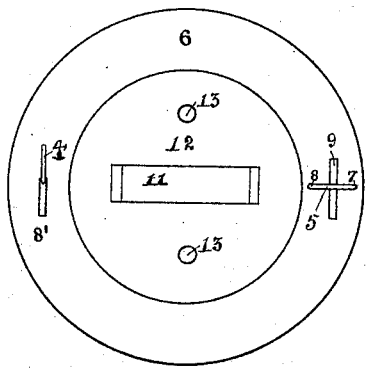
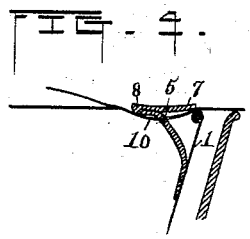
Witnesses
Arch. M. Catlin
James Smith
Inventor
Richard C. Andersen
By his Attorney
Benj. R. Catlin

UNITED STATES PATENT OFFICE.

RICHARD C. ANDERSEN, OF PAWNEE CITY, NEBRASKA.

COOKING UTENSIL.

SPECIFICATION forming part of Letters Patent No. 439,768, dated November 4, 1890.

Application filed July 10, 1890. Serial No. 358,283. (No model.)

*To all whom it may concern:*

Be it known that I, RICHARD C. ANDERSEN, a resident of Pawnee City, in the county of Pawnee and State of Nebraska, have invented certain new and useful Improvements in Cooking Utensils; and I do hereby declare the following to be a full, clear, and exact description of the invention, such as will enable others skilled in the art to which it pertains to make and use the same.

The object of the invention is to provide a culinary utensil or steaming-vessel adapted to be suspended by its cover in another vessel, which is thereby also covered; and it consists in the construction hereinafter described, and particularly pointed out.

In the accompanying drawings, Figure 1 is a perspective of a steaming-vessel and cover. Fig. 2 is a vertical section of the same placed in another vessel, and Fig. 3 is a plan of the cover. Fig. 4 is a sectional detail, and Fig. 5 is a plan of a modified cover.

Numeral 1 denotes the body of a steaming-receptacle, preferably made of perforated sheet metal. It can, however, be formed of wire or wire-cloth or made of unperforated material. Its wall is provided with one or more depressions or grooves 2, forming ledges upon which perforated disks 3 may be supported. The upper edge of the vessel 1 may be stiffened by wire or by equivalent means, as is usual.

To opposite sides of vessel 1 are secured hooks 4 and 5 for the attachment of the cover 6. The hook 5 is formed with a shank provided at the upper end with laterally extended portions 7 and 8, which, preferably, are slightly curved in an upward direction, as shown in Fig. 4. The hook 4 may have the same form, though in the present instance it is represented with but one extension at about a right angle with its shank or stem.

The cover 6 is slotted at 8' and 9 to permit the passage of the hooks when it is applied to the vessel. Preferably the cover is provided with an annular depression 10, and the aforesaid slots are formed therein. The slot 9 for the passage of the hook 5 is made lengthwise of the depression 10 and of sufficient length to permit the hook to pass through the same when the cover is suitably held at or swung to one side of the vessel 1 and so that the slot coincides with parts 7 and 8 of the hook. Having thus been placed over the hook 5, the cover can be swung around it as a pivot, so that the long member of the L-shaped slot 8' will receive the hook 4 when the cover is pushed down upon the vessel and over the hook 4, and thereupon by slightly rotating the cover on hook 5 the stem of hook 4 enters the transverse part of the L-shaped slot, and the cover is thereby locked upon the vessel, and the latter can be handled by means of its cover and the handle 11.

The forms of the hooks and the slots in the cover can be varied. Thus both hooks could be made either like hook 4 or hook 5, and one of them might be bent after it had been entered in a simple perforation in the cover, thereby forming a more permanent connection; and a hinged connection may be substituted for hook 5 for some of the purposes of the invention. The particular form illustrated permits the cover to be entirely removed from the vessel, when desired. The upward bend of the parts 8 and 7 also adapts them to ride upon the shoulders of the depression 10, and thus hold the cover firmly down. This same curvature of the parts 8 and 7 also adapts them to pass freely over the slot without engagement with the edges thereof when the cover is moved around the pivot or stem of hook 5, and its entire removal is not desired. At such times it is supported on the top of the vessel.

To remove the cover, it is turned about the stem of hook 5 a small distance or until the hook 4 is over the long part of the slot 8', when said cover, by slightly raising one side of it, is freed from the hook 4, and can be swung around and rested upon the edge of the vessel, which is thereby uncovered; or, if desired, the cover when partially swung around can be lifted entirely off the vessel and applied to another vessel.

It is obvious that if the above-described vessel and cover be placed in and upon another vessel of suitable size, as indicated in Fig. 2, the single cover suffices for both.

The cover is by preference provided with a dome 12, perforated, as at 13, and the handle is attached to this dome. The openings 13, which may be of any desired size and number, permit the circulation of air within the dome and prevent excessive heating of the handle.

By extending the openings to the body of the cover at one or more points provision is made for removing water or other matter that may accidentally fall through the openings and under the dome.

To use the device, vegetables or other articles are placed in the vessel 1, either upon its bottom or upon a shelf therein, and the cover having been applied to said vessel it is then suspended thereby in another vessel, which may be more or less filled with water according as it is desired to boil or steam the contents of vessel 1.

It will be obvious that vessel 1 can be suspended in kettles or vessels of different sizes, it being only necessary that the cover shall rest upon the top of the receiving-vessel.

Having thus described my invention, what I desire to secure by Letters Patent is—

1. A cooking pot or utensil, in combination with a steaming-vessel provided with hooks having lateral extensions, and a cover extending beyond the circumference of the steaming-vessel and to the pot, and provided with slots to receive the hooks, said hook-extensions and slots being adapted to permit the entire removal of the cover or to lock it in position on the vessel, substantially as set forth.

2. The steaming-vessel provided with hooks 4 and 5, and with the cover adapted to swing about the stem of hook 5, and provided with an L-shaped slot to receive hook 4 and lock the cover, substantially as set forth.

In testimony whereof I have signed this specification in the presence of two subscribing witnesses.

RICHARD C. ANDERSEN.

Witnesses.
D. D. DAVIS,
J. H. ECKMAN.